United States Patent [19]
Andersson et al.

[11] Patent Number: 4,597,872
[45] Date of Patent: Jul. 1, 1986

[54] METHOD FOR ANAEROBIC WASTEWATER TREATMENT

[75] Inventors: Per-Erik Andersson; Göran E. Annergren, both of Sundsvall; Hans E. Höglund, Matfors; Per V. Peterson, Sundsvall, all of Sweden

[73] Assignee: Purac Aktiebolag, Lund, Sweden

[21] Appl. No.: 637,820

[22] Filed: Aug. 6, 1984

[30] Foreign Application Priority Data

Aug. 10, 1983 [SE] Sweden ................ 8304354

[51] Int. Cl.⁴ .................. C02F 11/04; C02F 3/28
[52] U.S. Cl. .................. 210/605; 210/603; 210/615; 48/197 A
[58] Field of Search .......... 210/603, 605, 615–617, 210/180, 188, 218, 928; 48/197 A; 435/167

[56] References Cited
U.S. PATENT DOCUMENTS

| 4,022,665 | 5/1977 | Ghosh et al. | 210/603 |
| 4,067,801 | 1/1978 | Ishida et al. | 210/603 |
| 4,213,857 | 7/1980 | Ishida et al. | 210/603 |
| 4,461,708 | 7/1984 | Hakulinen et al. | 210/150 |
| 4,491,522 | 1/1985 | Ishida et al. | 210/603 |

FOREIGN PATENT DOCUMENTS 0077002 4/1983 European Pat. Off. .
55-155777 12/1980 Japan ................ 210/603

OTHER PUBLICATIONS

Pohland F. G. et al.; "An Application of Process Kinetics for Phase Separation of the Anaerobic Stabilization Process"; Progress in Water Technology, vol. 7, No. 1; pp. 173–189 (1975).
Klass D. L.; "Biomass as a Nonfossil Fuel Source", Am. Chemical Society Symposium Series 144 (1981).
Frostell B.; "Anaerobic-Aerobic Pilot Scale Treatment of a Sulphite Evaporator Condensate".

Primary Examiner—Benoit Castel
Attorney, Agent, or Firm—Burns, Doane, Swecker & Mathis

[57] ABSTRACT

The invention relates to a method of treating wastewater from closed manufacture of mechanical or chemimechanical cellulose pulp, which treatment is carried out in a hydrolysis and acid fermentation step and a methane fermentation step with subsequent sludge separation and recycling of separated sludge.

10 Claims, 3 Drawing Figures

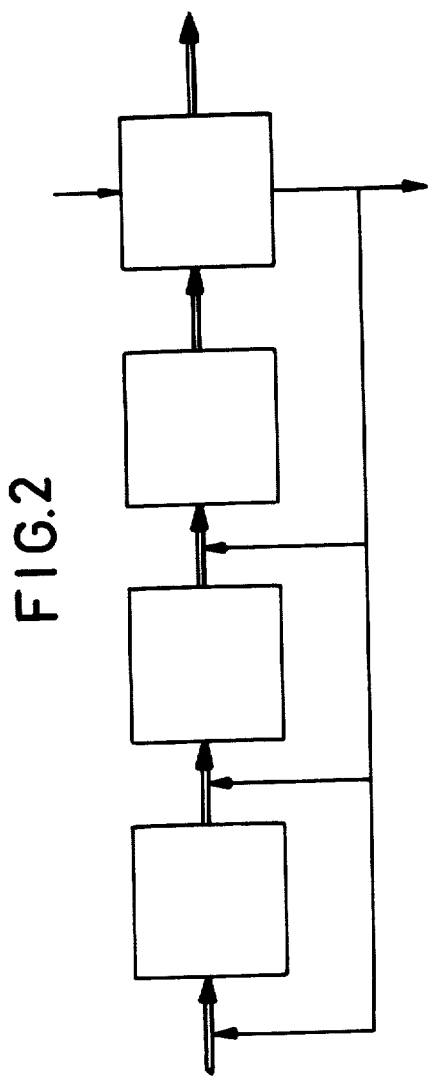

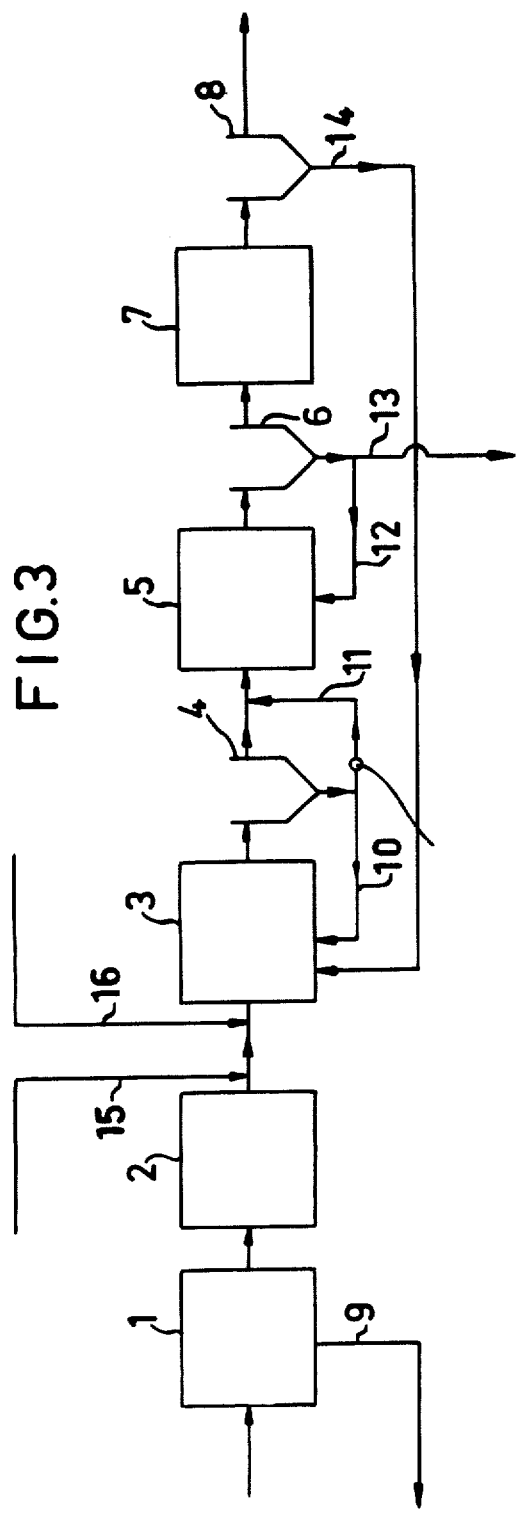

METHOD FOR ANAEROBIC WASTEWATER TREATMENT

BACKGROUND OF THE INVENTION

This invention relates to a method in the treatment of wastewater from the manufacture of mechanical or chemi-mechanical cellulose pulp at closed manufacturing processes. The treatment is carried out according to the invention in two steps, viz. a hydrolysis and acid fermentation step and a methane fermentation step.

Both of said steps are carried out as completely agitated contact reactor processes, and both steps are followed by a subsequent sludge separation step, by which the main part of separated sludge is recycled to the respective contact reactor. According to an important embodiment of the method according to the invention, long fibres are to a substantial part removed from the wastewater.

BRIEF DESCRIPTION OF THE DRAWINGS

FIG. 2 is a flow chart of a process for manufacturing mechanical pulp with reduced water consumption; and FIG. 3 is a flow chart of the preferred process of the invention.

DETAILED DESCRIPTION OF A PREFERRED EMBODIMENT

Figure 1:
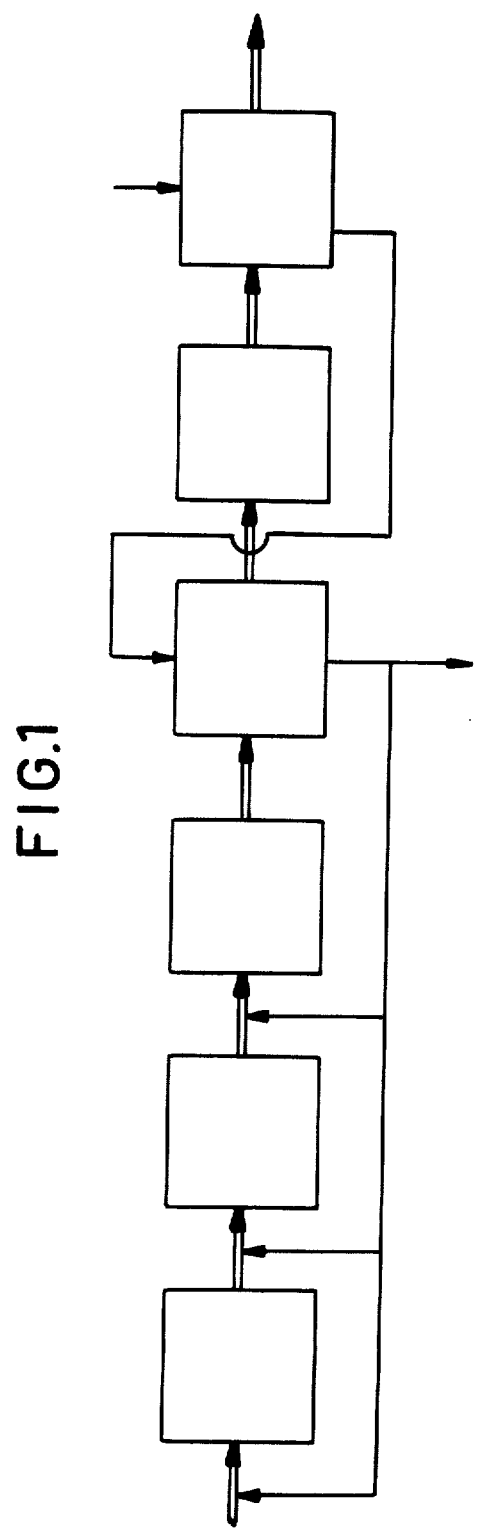
FIG. 1 is a flow chart of a process for manufacturing mechanical or chemi-mechanical pulp with reduced water consumption.

Wastewater from the manufacture of mechanical, and particularly thermo-mechanical pulp, so-called TMP, and chemi-mechanical pulp, so-called CMP, contains long fibres as well as fibre fragments and fibrils. In the course of the work, on which the present invention is based, it was found that the bacteria present in the hydrolysis step grow on and add to the fibre fragments and fibrils found in the wastewater. They did not show a tendency of adhering to the whole fibres or long fibres found in the wastewater. When the water included fibrils and fibre fragments, these bacteria did not show a tendency of growing on other surfaces in the reaction step namely, the whole fibres or long fibres. This is an observation, on which the present invention, among other things, is based. It also was found that this complex of fibrils and bacteria was easy to separate by sedimentation. It was possible, therefore, to carry out the hydrolysis step in a totally agitated contact reactor with a subsequent sedimentation step where the sludge is separated by sedimentation. The sludge was recycled to the hydrolysis step. Due to the very good sedimentation properties of this sludge complex, it is possible to maintain a high sludge concentration and thereby a high bacteria density in the hydrolysis step. It is hereby possible to achieve an extensive hydrolysis of the water. In the hydrolyis, low-molecular weight organic acids, especially acetic acid, are obtained as hydrolysis products.

The bacteria sludge formation in the hydrolysis step is substantial. The excess of bacteria sludge can be taken out from the hydrolysis step and be passed to sludge destruction. The organic material, which thereby is transported to the methane fermentation step, then gives rise to a low methane formation, seen on the whole. According to another important embodiment, the bacteria sludge of the hydrolysis step is transferred to the methane fermentation step and is fermented to methane, whereby the methane yield is increased substantially.

It was found according to the invention, that the conversion of carbohydrates to simple organic acids in the hydrolysis step can be driven far, and that the bacteria sludge can, without inconvenience, be transferred to the methane fermentation step where it to a great extent is converted to methane. It was found that this can take place when the conversion of carbohydrates to simple organic acids exceeds 70%, suitably 80% and preferably 85%. When the conversion of carbohydrates in the hydrolysis is lower, the sludge formation in the methane fermentation step increases, and at the same time a bacteria sludge is obtained which is difficult to settle.

In order to obtain the minimum 70% carbohydrate conversion, it was found suitable to subject the wastewater from the mechanical pulp process prior to the treatment plant to a treatment by which the long fibre content is removed from the wastewater while the content of fibrils and fibre fragments in the wastewater is maintained at a suitable level. This can be carried out by conventional technology, for example in arch screens with suitable gap width, which remove the long fibre constituent at the same time as a suitable amount of fibrils and fibre fragments is permitted to pass through. Studies of the hydrolysis step have shown that the content of fibrils and fibre fragments should amount to between 100 and 1500 mg/liter, suitably between 150 and 700 mg/liter, and preferably between 150 and 500 mg/liter. By carrying out the hydrolysis and acid fermentation in this way, also part of the fibre substance is converted to methane.

By carrying out the hydrolysis in a separate hydrolysis step, the main part of the carbohydrates is converted to acetic acid. In the methane fermentation step a methane bacteria culture with very good sedimentation properties is thereby obtained. The methane fermentation step, therefore, can be carried out in the same way as the hydrolysis step in a completely agitated contact reactor with a subsequent sedimentation step. The main part of the bacteria sludge from the methane fermentation step is recycled. The excess sludge from the methane fermentation step is taken out for destruction. The bacteria sludge amount obtained from the methane fermentation step by this process is substantially smaller than in the case when the hydrolysis and methane fermentation steps are carried out together or when only a smaller part of the hydrolysis had taken place in the hydrolysis step. Owing to the good sedimentation properties of the bacteria sludge in the methane fermentation step, the bacteria density in the methane fermentation step can be kept high, and the volume thereby can be smaller at the same reaction degree.

The water from the methane fermentation step then is transferred to an aerobic treatment step, which can be carried out as an active sludge step or in a biological tower with after-sedimentation. It was found that the aerobic step advantageously can be carried out in a biological tower where the water after the anaerobic treatment easily can be decomposed aerobically. Subsequent to the aerobic step an after-sedimentation step is carried out in known manner. The sludge from the aerobic step is advantageously transferred to the hydrolysis step.

The hydrolysis step includes optionally anaerobic bacteria. By transferring the aerobic sludge with its enzyme systems to the hydrolysis step, these enzyme systems can be utilized for the destruction of compounds and toxic substances, which for their decomposition require an aerobic system. It was found, for example, that hydroperoxides, which occasionally are used for bleaching mechanical pulp are extremely toxic in the methane fermentation step. The supply of hydroperoxide to a methane fermentation step kills the methane bacteria within a very short period of time. By carrying out a hydrolysis step prior to the methane fermentation step for the treatment of wastewater from the manufacture of bleached mechanical pulp, a hydrolysis bacteria culture was obtained adapted to the wastewater with the capacity of completely decomposing hydroperoxide in supplied wastewater. By supplying also aerobic sludge to the hydrolysis step, the capacity of the hydrolysis step to decompose hydroperoxide could be improved still more.

The aerobic sludge obtained in the aerobic step binds to itself the nutrient salts nitrogen and phosphorus and also certain tracer metals. By recycling aerobic sludge, the content of nitrogen and phosphorus in the hydrolysis step and in the methane fermentation step is increased, and at the same time the content of certain essential tracers is increased. The recycling of the aerobic sludge to the hydrolysis step, besides, implies the advantage that the aerobic sludge to a great extent is hydrolized and therefore ready for being converted to methane in the methane fermentation step.

The work of reducing the water consumption during the manufacture of mechanical or chemi-mechanical pulp has shown that it is fully possible to achieve very low water consumption provided the process is carried out correctly. We have found earlier that, when the process is provided with a washing step and the fresh water is directed in consequent counterflow, substantially lower water consumption can be tolerated without giving rise to process problems or quality problems of the manufactured product. A process utilizing a technology permitting low water consumption at the manufacture of mechanical or chemi-mechanical pulp is shown in FIG. 1. It is fully possible in this way to achieve a water consumption which is lower than 10 m$^3$/ton pulp. Experiments on half-size scale have shown that it should be possible to reduce the water consumption to 3–4 m$^3$/ton pulp.

In a corresponding manner, the water consumption at the manufacture of mechanical pulp at the integrated making of paper, for example newsprint, can be reduced, as shown in FIG. 2. By installing washing systems in the production process, controlling the water flow and decreasing the fresh water supply, very concentrated wastewaters can be obtained. This technology has opened possibilities of treating this type of wastewater by anaerobic technology in a highly successful way. Even in integrated manufacture it is possible to achieve a value as low as 3–5 m$^3$ water/ton pulp.

The invention is described in greater detail in the following by an embodiment thereof and with reference to the accompanying

EXAMPLE

Incoming water from the manufacture of thermomechanical pulp in an amount corresponding to about 5 m$^3$/tonne pulp is passed to the treatment plant where it is subjected in a first step to fibre separation, at which the main part of the long fibres is separated while fibrils, fibre fragments and fines pass through the separation step together with the water. The separation is carried out in an arch screen, but also other types of fibre fractionation equipment can be used. After the fibre fractionation, the content of suspended substances amounts to about 400 mg/liter. The water is still warm and, therefore, is cooled from about 60° C. to 35°–37° C. in a heat exchanger. After the heat exchanger, the pH of the water is adjusted so that the pH after the subsequent hydrolysis and acid fermentation step amounts to between 6.0 and 6.5. Besides, nutrient salts are added. During conventional aerobic treatment nutrient salts usually are supplied so that after the addition of nutrient salts the ratio BOD:N:P amounts to about 100:5:1. In anaerobic treatment, only a fraction of the nutrient salt addition is required.

The water is thereafter directed to the hydrolysis and acid fermentation step which can be carried out in a completely agitated contact reactor with subsequent sludge sedimentation step. It is desirable, in view of the process stability, to maintain a sludge content as high as possible in the hydrolysis step. Therefore, the main part of the sedimented sludge is recycled. Due to the bacteria culture in the acid fermentation step growing on the relatively easily settling fibre particles, the bacteria density in the step is high.

In the hydrolysis and acid fermentation step, carbohydrates in the incoming water are converted to low-molecular organic acids. On one occasion, when incoming water held 2.5 g sugar species, and the holding time in the reactor was 12.5 hours, a sugar content of 0.4 g/liter was obtained in the outgoing water. 84% of ingoing sugar species had been converted to low-molecular organic acids, substantially acetic acid. The water from the sludge separation step of the hydrolysis step is transferred to the methane fermentation step. In the hydrolysis step relatively great amounts of biological sludge are formed which grow on the fibre material. This excess sludge can be transferred without problems to the methane fermentation step.

The methane step in principle consists of a methane fermentation step and a sludge separation step. The reaction products from the hydrolysis step substantially consist of acetic acid. In the methane step a methane bacteria culture of rod-shaped methane bacteria is obtained which has excellent flocculation and sedimentation properties.

The methane fermentation step is designed as a completely agitated contact reactor step with subsequent sedimentation step. The main part of the biological sludge is recycled from the separation step to the contact reactor. A small part of the excess sludge is taken out of the process from the sludge separation step of the methane step.

Subsequent to the methane step an aerobic step follows, which in the Example is carried out in a biological tower. The aerobic process forms a certain amount of aerobic sludge, which is separated and recycled to the hydrolysis and acid fermentation step.

The invention is not restricted to the embodiment shown, but can be varied within the scope of the invention idea.

We claim:

1. A method for treating carbohydrate containing wastewater from the manufacture of mechanical or chemi-mechanical cellulose pulp, the wastewater including long fibres, fibrils and fibre fragments comprising the following sequential steps of:

(i) removing the long fibres to a substantial extent from the wastewater such that 100–500 mg/liter of the fibrils and fibre fragments remain;
(ii) anaerobically carrying out hydrolysis and acid fermentation of said wastewater until at least 70% of the carbohydrates in the wastewater are degraded to low molecular weight organic acids and an excess of sludge is formed;
(iii) transferring said wastewater, said low molecular weight organic acids and said excess of sludge to a separate methane fermentation step; and
(iv) anaerobically carrying out methane fermentation of the low molecular weight organic acids and the excess of sludge.

2. The method as defined in claim 1 further comprising the steps of aerobically decomposing the wastewater after the step of anaerobically carrying out the methane fermentation.

3. The method as defined in claim 2, the aerobic step being carried out as an active sludge step or in a biological tower with subsequent sedimentation.

4. The method as defined in claim 2 further comprising the step of separating sludge from said wastewater after at least one of said anaerobic hydrolysis and acid fermentation, anaerobic methane fermentation and aerobic decomposing steps.

5. The method as defined in claim 4, wherein excess sludge is separated from the wasterwater after the aerobic decomposition step and is transferred to the hydrolysis step.

6. The method as defined in claim 4, wherein excess sludge is separated from the wastewater after the methane formation step and is discharged from the system.

7. The method as defined in claim 1 wherein 150–700 mg/liter of fibrils and fibre fragments remain after the step of removing the fibres from the wastewater.

8. The method as defined in claim 7 wherein 150–500 mg/liter of fibrils and fibre fragments remain after the step of removing the long fibres from the wastewater.

9. The method as defined in claim 1 wherein at least 80% of the carbohydrates in the wastewater in the hydrolysis and acid fermentation step are degraded to low molecular weight organic acids.

10. The method as defined in claim 9 wherein at least 85% of the carbohydrates in the wastewater in the hydrolysis and acid fermentation step are degraded to low molecular weight organic acids.

* * * * *

UNITED STATES PATENT AND TRADEMARK OFFICE
CERTIFICATE OF CORRECTION

PATENT NO. : 4,597,872
DATED : July 1, 1986
INVENTOR(S) : Andersson et al

It is certified that error appears in the above-identified patent and that said Letters Patent is hereby corrected as shown below:

Claim 1, column 5, line 2, amend

"100-500" to --100-1500--.

Signed and Sealed this

Fifth Day of July, 1988

*Attest:*

*Attesting Officer*

DONALD J. QUIGG

*Commissioner of Patents and Trademarks*